June 1, 1948.　　　　　O. H. SCHMITT　　　　　2,442,619
RADIO-FREQUENCY POWER METER
Filed Jan. 15, 1946　　　　　　　　　　　　　　2 Sheets-Sheet 1
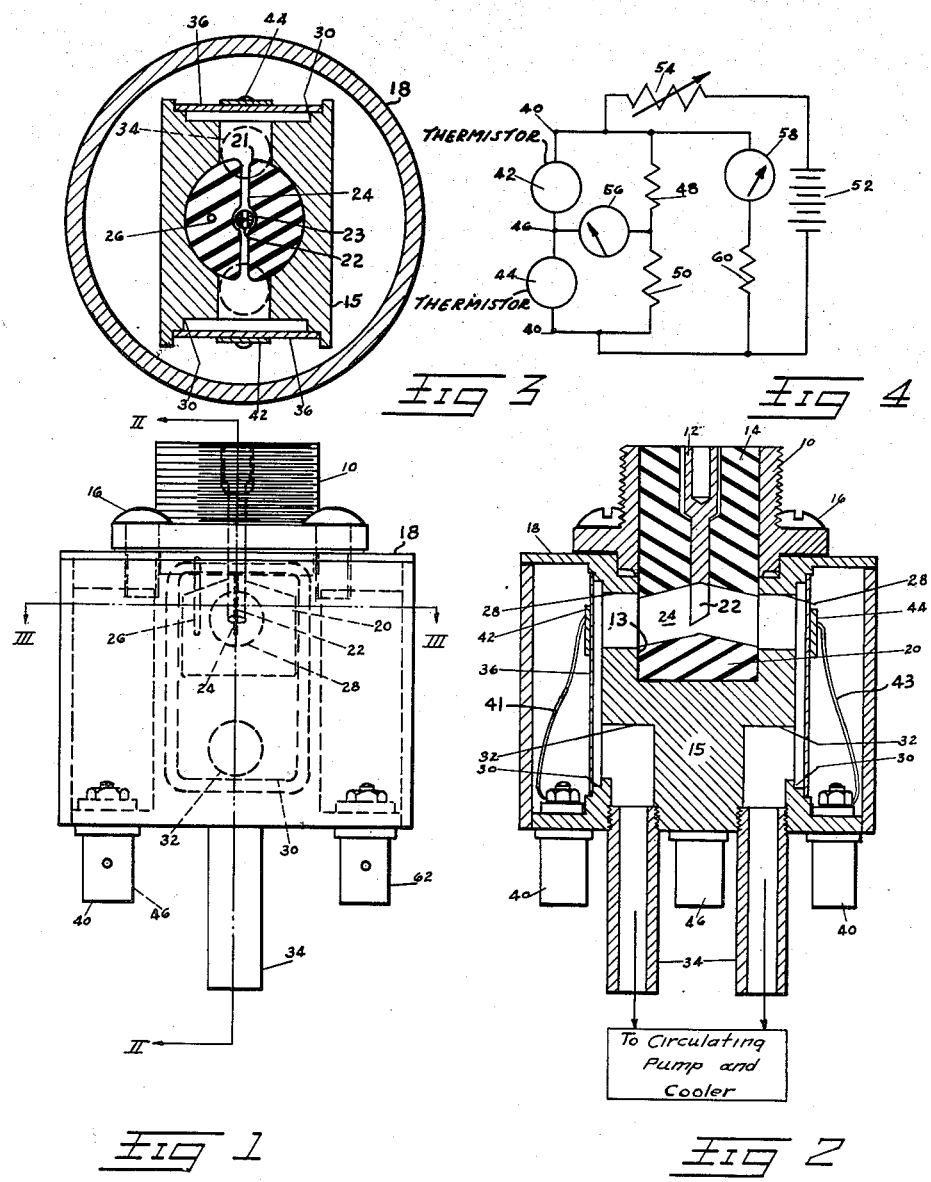
INVENTOR.
Otto H. Schmitt
BY
ATTORNEY June 1, 1948. O. H. SCHMITT 2,442,619
RADIO-FREQUENCY POWER METER
Filed Jan. 15, 1946 2 Sheets-Sheet 2
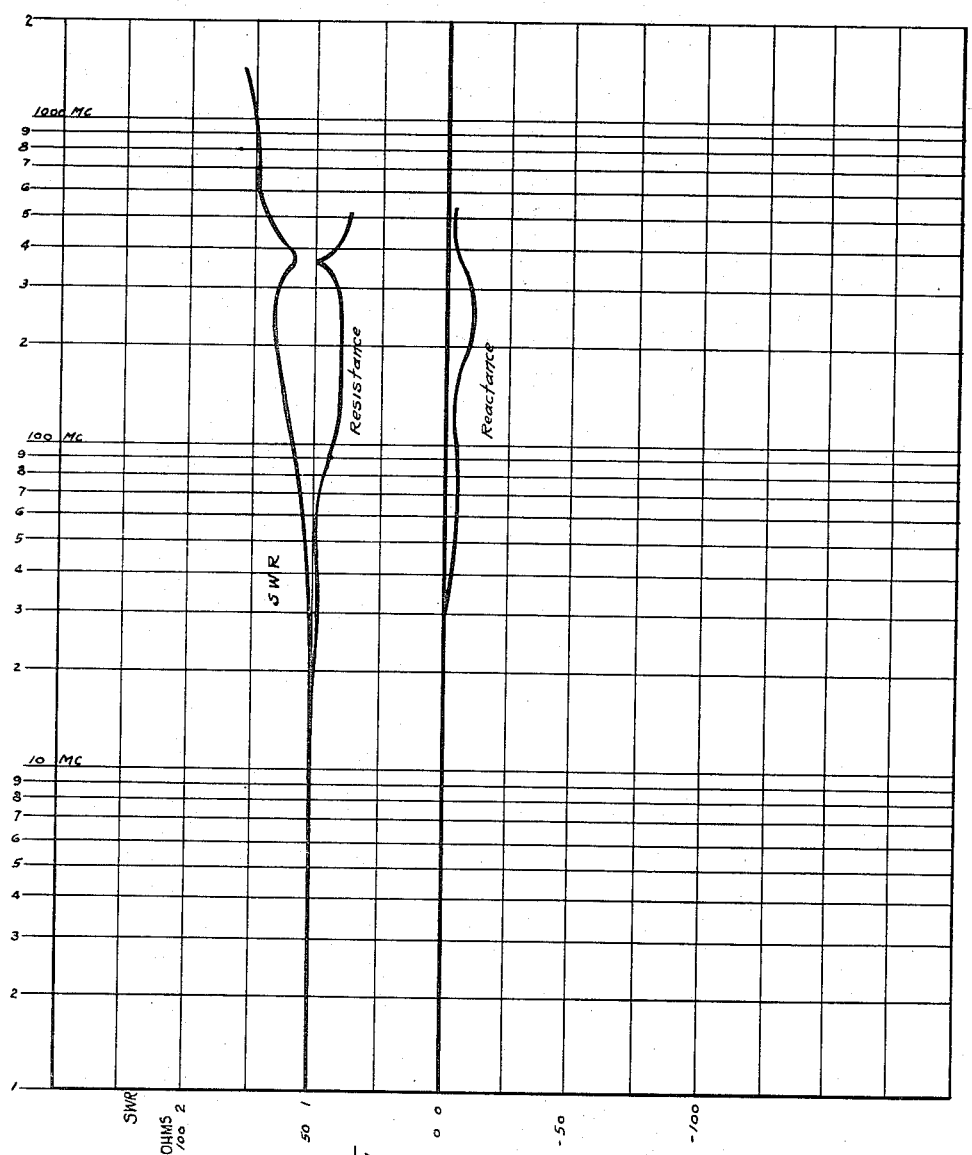
INVENTOR.
Otto H. Schmitt
BY
M.C. Hayes
ATTORNEY

UNITED STATES PATENT OFFICE 2,442,619

RADIO-FREQUENCY POWER METER

Otto H. Schmitt, Mineola, N. Y., assignor to the United States of America as represented by the Secretary of the Navy Application January 15, 1946, Serial No. 641,336

10 Claims. (Cl. 171—95)

This invention relates to radio-frequency dummy loads, and more particularly to radio-frequency loads in which the power dissipated may be accurately measured.

A primary object is to provide means for dissipating a relatively large amount of high-frequency power wherein the impedance presented to the radio-frequency device loaded remains substantially constant and resistive in character over a wide range of frequencies. A further object is to provide such a load that is adaptable to measurement of the power dissipated.

It is well known in the prior art to utilize a large volume of brine between a pair of electrodes as a power-dissipating resistor both for alternating-current of power frequency and for direct-current. Less widely known, salt solutions have been circulated along wave guides for high-frequency power dissipation the arrangement being such that the inlet and the outlet are spaced along the guide for a relatively great distance compared with the operating wave length. Finally, small volumes of graphite mixtures have been used to terminate coaxial lines, cooling fins being provided adjacent the termination where appreciable amounts of high-frequency power are to be dissipated. These prior-art devices have had various shortcomings. Where electrolyte flows along a wave guide for appreciable lengths, the impedance presented to the device being tested varies widely in reactive component, as a function of frequency. The dimensions and maximum allowable temperature of a graphite load limit the amount of power that can be dissipated. This type of load is not easily adaptable to accurate measurement of the power being dissipated, and its resistance may vary substantially with variable heating.

According to the present invention, brine or other fluid conductor of appropriate resistivity is passed in a thin, uniform-area stream transverse of a coaxial line. The width of the stream measured along the coaxial line is made small compared with the shortest wave length with which the device is to be used. The fluid conductor is circulated at a known, constant rate, and is alternately heated in the load and cooled in a radiator. This dummy load is almost purely resistive at a substantially constant value, even at operating frequencies beyond 500 megacycles per second. In the arrangement to be described, the difference in brine temperature between the inlet and outlet ports adjacent the coaxial conductor may be depended on, at a predetermined circulation rate, for obtaining accurate, direct readings of dissipated power.

The invention will be better understood from the following detailed disclosure in which:

Fig. 1 is an external view of a specific embodiment thereof;

Fig. 2 is a section along the line II—II of Fig. 1;

Fig. 3 is a sectional view along the line III—III of Fig. 1;

Fig. 4 is the wiring diagram of a preferred form of dissipated-power indicating circuit; and Fig. 5 is a graph illustrating the performance of the specific embodiment described.

In Figs. 1 and 2, outer conductor 10, inner conductor 12 and dielectric material 14 between conductors 10 and 12 constitute a coaxial line connector for a coaxial transmission line from the radio-frequency device to be tested. By any suitable means, such as through a tight fit, staking, or turned-in edges on the coaxial conductors, dielectric material 14 is prevented from moving relative to either conductor. Screws 16 fasten the connector to body portion 18 of the load. In a cylindrical cavity 13 provided or formed in a reentrant portion 15 of the body portion 18, there is provided another dielectric portion 20 arranged to abut dielectric 14 firmly. Inner conductor 12 is terminated an appreciable distance short of the bottom of this cavity. The end of conductor 12 has a slot 22 (Fig. 3) which is aligned with a transverse slot 24 in dielectric portion 20. Dielectric portions 14 and 20 are formed as two separate pieces for convenience in forming this slot. These two portions are properly oriented and are locked against relative rotation by means of a longitudinal pin 26 which is also of dielectric material. A pair of bores 28, on an axis at right angles to that of the coaxial line, are centered about the ends of slot 24 and are greater in diameter than the axial extension or width of that slot. A pair of shallow, rectangular recesses 30 are formed along nearly the full length of a pair of opposite sides of the reentrant portion 15. These recesses are enclosed by thin metal plates 36, chosen for good thermal conductivity and for resistance to corrosion by the fluid. Plates 36 may be brazed or otherwise secured to the reentrant portion 15. The recesses 30 connect each bore 28 with respective ones of a pair of inverted L-shape bores 32 and, in turn, to a respective hose coupling 34. The fluid enters either hose coupling 34, and leaves by the other hose coupling 34 to be cooled, after having passed through a bore 32, a shallow recess 30, a bore 28, slots 22, 24 transverse of the coaxial line, and the other bore 28, recess 30 and bore 32.

The operation of the structure to this point will be readily understood. Connection of coaxial line coupling 10, 12 to an R.-F. power source and consequent passage of high-frequency power therethrough causes heating of the circulating fluid. Slots 22, 24 is of substantially uniform cross-sectional area, and disposed transversely of the fluid path, an important factor contributing to the success of this load. This not only minimizes fluid friction and turbulence for a given value of termination resistance and fluid conductivity, but also results in uniform development of heat along the path. Were the side walls of the slots divergent along radii, the radial voltage gradient would equal that along the dielectric; but there would be less heat developed at the diametral extremes, and a serious concentration of heating about the inner conductor for any given amount of power to be dissipated.

It will be understood that is not necessary that the outer conductor be capped with metal; for, indeed the coaxial line might be arranged in some circuits to continue beyond the dummy load described. However, where a conductive cap terminates the outer conductor, the fluid path and the end of the inner conductor should be adequately spaced from the cap to minimize the shunt capacity.

One surface of each of a pair of thermistors 42 and 44 is secured, as by low-melting point solder, to plates 36 for good thermal and electrical contact. The thermistor surfaces opposite plates 36 are connected by conductors 41, 43 to respective ones of a pair of insulated binding posts 40 mounted on body portion 18. A third binding post 46, which is electrically connected to the reentrant portion 15 and in turn to plates 36, constitutes a thermistor junction terminal for the dissipated-power measuring circuit to be described.

As shown in Fig. 4, thermistors 42 and 44 constitute two arms of a Wheatstone bridge, the remaining two arms of which include resistors 48 and 50. This bridge is energized by power supply 52 through adjustable resistor 54, which is advantageously large enough to substantially determine the total current in the circuit. An indicator 56 is connected between the junctions of the thermistors 42, 44 and of the resistors 48, 50. Thermistors 42 and 44 are alike in temperature when there is no R.-F. input to the coaxial line. Resistors 48 and 50 are arranged to balance the bridge as determined by indicator 56 after the fluid flow is established. Resistor 54 is adjusted to apply an arbitrary predetermined voltage to the bridge as indicated by voltmeter 58. In this way, variations in voltage of power supply 52 may be compensated from time to time. Alternatively, a single meter might be switched from the "calibrate" position in place of microammeter 58 (Fig. 4) to the "measure" position in place of microammeter 56, an appropriate meter multiplier 60 being permanently connected to one input terminal of the bridge.

By supplying various amounts of low-frequency A.-C. power to the coaxial line, the unbalance indicator may be directly calibrated in dissipated watts for any definite rate of fluid circulation. The unbalance is caused by a temperature difference between the two thermistors and a consequent difference in their relative resistance. Heating of the fluid represents the power dissipated, which is the same for high frequencies as for low-frequency power. The unbalance indication depends largely on a temperature difference; the usual variations in temperature of the cooled brine introduces only a small error, perhaps one or two per cent when this thermistor circuit is used.

The brine in use with one model of this illustrative embodiment is of 11 per cent salt concentration which, with the dimensions below, yields a 50-ohm resistance. In this model of the embodiment the diameter of dielectric portions 14 and 20 (of high-frequency G. E. Textolite) is one inch, the width of slot 24 measured along the cylindrical axis is 1/16 inch and the thickness of slot 24 is .027 inch. Dielectric portion 20 spaces the end of conductor 12 by 3/8 inch from the bottom wall of the cavity 13 in reentrant portion 15.

The frequency-variations of resistance, of reactance and of standing-wave-ratio of this model are shown in Fig. 5. The curves are drawn to the upper limit of the test equipment. These characteristics show that the reactive component is very low at least up to 500 megacycles per second; that the resistance is well sustained at 50 ohms up to 500 megacycles per second (well within tolerable limits of mismatch); and that the standing-wave-ratio remains well within the conventionally accepted limit of 2:1 up to 1500 megacycles per second.

In place of thermistors as temperature-sensitive elements, any number of series-connected thermocouples might be arranged alternately in thermal but not electrical contact with the two plates 36. Such thermocouples have in fact been built into the model of R.-F. load described, in addition to the thermistors. The thermocouples have been omitted from the drawings to avoid confusion. However, one of the two binding posts 62 between which the series connected thermocouples were connected is shown. When used with a galvanometer, the series thermocouples give a more accurate measurement of the dissipated power than do the thermistors. The thermistor arrangement, utilizing a battery and an ordinary meter, constitutes a more portable and rugged instrument.

Certain other precautions not heretofore mentioned should be observed. Reentrant portion 15, plates 36 and the circulating pump and radiator system for cooling the fluid should be made of materials resistant to corrosion. Bores 28 should be made larger in diameter than the axial width of slot 24 to avoid high current-densities at the point where the brine leaves the dielectric material. Slot 24 may be flared at its diametral extremes to minimize turbulence, as indicated at 21 in Fig. 3. To prevent excessive local temperature rises at the slotted end of inner conductor 12, dielectric portion 20 may be relieved as at 23 (Fig. 3) so that the brine may circulate not only through slot 22 but also around the outside surface of conductor 12. Generally, the transverse area of the brine path should be made small and substantially uniform, to maintain a uniform voltage gradient along the fluid path to prevent intense local heating.

The abutting surfaces of dielectric portions 14 and 20 in this embodiment were made slightly conical for mechanical convenience. An axial screw (not shown) may be used for forcing dielectric portion 20 into more perfect contact with dielectric 14. It will be apparent that there are many more details in the particular embodiment described which may be omitted or modified without departing from the invention defined in the appended claims.

What is claimed is:

1. High-frequency apparatus, comprising a section of coaxial transmission line having a solid dielectric body substantially filling the space between the inner and outer conductors of said line, said solid dielectric body having a slotted portion aligned with said inner conductor and adapted to provide passage for a fluid, said outer conductor having diametrically opposed apertures in alignment with the slotted portion of said dielectric body, and means adjacent the apertures of said outer conductor for passing a fluid through said passage.

2. High-frequency apparatus, comprising a section of coaxial transmission line having spaced inner and outer conductors, a solid dielectric body substantially filling the space between the inner and outer conductors of said line section, said solid dielectric body and said inner conductor having aligned slotted portions adapted to provide passage for a fluid, said outer conductor having diametrically opposed apertures in alignment with the slotted portions of said dielectric body and said inner conductor, and means adjacent the apertures of said outer conductor for passing a fluid stream through said passage.

3. A termination for high-frequency coaxial transmission lines, comprising a section of coaxial transmission line adapted to be coupled to the line to be terminated and having a solid dielectric body substantially filling the space between the inner and outer conductors thereof, said solid dielectric body and said inner conductor having aligned slotted portions adapted to provide passage for an electrically conductive fluid, the outer conductor of said section of line having diametrically opposed apertures in alignment and communicating with the slotted portions of said dielectric body and said inner conductor; and means adjacent the apertures of said outer conductor for passing said electrically conductive fluid through said passage.

4. The termination defined in claim 3 wherein said passage is of small axial extension relative to one wavelength at the operating frequency of the line to be terminated.

5. The termination defined in claim 3 wherein said passage is of small axial extension relative to one wavelength at the operating frequency of the line to be terminated and of transverse dimension of the order of magnitude of the diameter of said inner conductor, and said fluid-passing means comprises a pump for maintaining a high-velocity stream of electrically conductive fluid.

6. Apparatus for measuring high-frequency electric power, comprising a section of coaxial transmission line adapted to be coupled to a source of power to be measured, means defining a passage through said section of line and said body, said passage being of polygonal cross section and of longitudinal and transverse dimensions small compared to the longitudinal and transverse dimensions of said section of line, means for maintaining a stream of electrically-conductive fluid in said passage, said fluid being adapted, upon absorption thereby of a portion of the high-frequency power, to provide differential temperature conditions at spaced points therein, and thermally responsive means adjacent spaced points of said fluid for indicating the magnitude of said differential temperature conditions.

7. The apparatus defined in claim 6 wherein said fluid stream is directed substantially transversely of said section of coaxial line.

8. The apparatus defined in claim 6 wherein said thermally responsive means are disposed exteriorly of said stream and in thermal-energy-absorbing relation therewith.

9. Apparatus for measuring high-frequency electric power, comprising a section of coaxial transmission line adapted to be coupled to a source of power to be measured, a solid dielectric body substantially filling the space between the inner and outer conductors of said section of line, means defining a passage through said section of line and said body, said passage being of longitudinal and transverse dimensions small compared to one wavelength at the frequency of the power to be measured, means for maintaining a stream of electrically conductive fluid in said passage, said fluid being adapted, upon absorption thereby of a portion of the high-frequency power, to provide differential temperature conditions at spaced points therein, and thermally responsive means adjacent spaced points of said fluid for indicating the magnitude of said differential temperature conditions.

10. Apparatus for measuring high-frequency electric power, comprising a first section of coaxial transmission line adapted to be conductively coupled to a source of power to be measured, a body member having a reentrant portion provided with an axial bore, the wall of said bore being disposed as a conductive extension of the outer conductor of said coaxial line section, the inner conductor of said coaxial line section extending partly within said bore and forming with said wall a second section of coaxial line, a solid dielectric element substantially filling the space between the inner and outer conductors of said first and said second sections of coaxial line, means including spaced conductive plate members mounted on opposed exterior portions of said body member and providing closures for recesses formed in said body member for providing a passage extending in part through said second section of coaxial line and said dielectric element, means for maintaining a continuous stream of electrically conductive fluid in said passage, and thermally responsive means carried by said plate members and disposed in thermally conductive relation with spaced points of said fluid for indicating differential temperature conditions existing at said spaced points.

OTTO H. SCHMITT.

REFERENCES CITED

The following references are of record in the file of this patent:

UNITED STATES PATENTS

| Number | Name | Date |
| --- | --- | --- |
| 2,262,134 | Brown | Nov. 11, 1941 |
| 2,284,379 | Dow | May 26, 1942 |
| 2,398,606 | Wang | Apr. 16, 1946 |
| 2,400,777 | Okress | May 21, 1946 |